(12) United States Patent
Needelman et al.

(10) Patent No.: US 7,136,752 B2
(45) Date of Patent: Nov. 14, 2006

(54) METHOD AND APPARATUS FOR ON-BOARD AUTONOMOUS PAIR CATALOG GENERATION

(75) Inventors: David D. Needelman, Torrance, CA (US); Rongsheng Li, Hacienda Heights, CA (US); Richard A. Fowell, Rolling Hills Estates, CA (US); Peter C. Lai, Alhambra, CA (US); Yeong-Wei A. Wu, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 14 days.

(21) Appl. No.: 10/710,178

(22) Filed: Jun. 24, 2004

(65) Prior Publication Data
US 2005/0154529 A1 Jul. 14, 2005

Related U.S. Application Data

(60) Provisional application No. 60/535,258, filed on Jan. 9, 2004, provisional application No. 60/535,721, filed on Jan. 9, 2004.

(51) Int. Cl.
G05D 1/00 (2006.01)
G01C 21/02 (2006.01)
(52) U.S. Cl. .................... 701/222; 244/164; 701/13
(58) Field of Classification Search .................. 701/13, 701/222, 226, 220, 214; 244/164, 171; 250/203.6; 342/357.11, 357.14, 357.15
See application file for complete search history.

(56) References Cited

U.S. PATENT DOCUMENTS

| | | | | |
|---|---|---|---|---|
| 4,688,091 A | * | 8/1987 | Kamel et al. ............... | 348/147 |
| 5,473,746 A | * | 12/1995 | Pritt et al. .................. | 715/784 |
| 5,745,869 A | * | 4/1998 | van Bezooijen ............ | 701/222 |
| 5,878,358 A | * | 3/1999 | Parsons et al. ................ | 701/1 |
| 6,012,000 A | * | 1/2000 | Holmes et al. ............... | 701/13 |
| 6,266,616 B1 | * | 7/2001 | Needelman .................. | 701/222 |
| 6,289,268 B1 | * | 9/2001 | Didinsky et al. ............. | 701/13 |
| 6,330,988 B1 | * | 12/2001 | Liu et al. ..................... | 244/164 |
| 6,362,464 B1 | * | 3/2002 | Liu et al. .................. | 250/206.1 |
| 6,478,260 B1 | | 11/2002 | Rice et al. | |

(Continued)

OTHER PUBLICATIONS

Kudva, P. and Throckmorton, A. "Preliminary Star Catalog Development for the Earth Observation Systems AMI (EOS-AMI) Mission", AIAA Journal of Guidance, Control and Dynamics, vol. 19, No. 6, pp. 1332-1336, 1996.

(Continued)

Primary Examiner—Dalena Tran
(74) Attorney, Agent, or Firm—Ostrager Chong Flaherty & Broitman P.C.

(57) ABSTRACT

A system (18) includes: a) A vehicle (12) includes an attitude or angular velocity control system (38), a plurality of star trackers or star sensors (22) each having a field of view (28); b) a memory (30) having a star catalog (32), an allocated area for a star pair catalog (58) and a reference table (56) stored therein; and c) a processor (24) coupled to the attitude or angular velocity control system (38), the star trackers or star sensors (22), and the memory (30). The processor (24) populates the star pair catalog (58), using the method described herein. The processor (24) then periodically determines the vehicle inertial attitude or angular velocity or sensor alignment, based, in part, on the star pair catalog (58) and reference table (56). The novel ability of the software to autonomously populate the star pair catalog (58) allows users to avoid uploading a large amount of data, and the problems associated with such an upload.

46 Claims, 4 Drawing Sheets

U.S. PATENT DOCUMENTS 6,775,600 B1 * 8/2004 Harman et al. ............... 701/13

OTHER PUBLICATIONS

Bone, Jeffrey W., "On-orbit Star Processing Using Multi-Star Star Trackers", Apr. 5-8, 1994, SPIE vol. 2221, pp. 6-14.

Wicenec, A.J. and Albrecht, M., "Methods for Structuring and Searching Very Large Catalogs", 1998, Astronomical Society of the Pacific, pp. 512-515.

Barrett, P., "Application of the Linear Quadtree to Astronomical Databases", Astronomical Data Analysis Software and Systems IV, ASP Conference Series, vol. 77, 1995, pp. 1-4.

Strikwerda, Thomas E. and Junkins, John L., "Star Pattern Recognition and Spacecraft Attitude Determination", May 1981, US Army ETL.

Ju, Gwanghyoek and Lee, Sang Kee, "Attitude Determination for Kompsat-2 Using Star Identification Technique", AAS 02-100, pp. 1-17.

Heide, E.J.v.d., Kruijff, M., Douma, S.R. and Lansink, D. Oude, "Development and Validation of a Fast and Reliable Star Sensor Algorithm with Reduced Data Base", IAF-98.A.6.05, pp. 1-13.

Potteck, S., "A Star Recognition Algorithm Based on Star Groups and Associated Means", aAAS 99-011, pp. 87-94.

Mortari, Daniele, Junkins, John L. and Samaan, Malak A., "Lost-In-Space Pyramid Algorithm for Robust Star Recognition", AAS 01-004, pp. 1-20.

Mortari, Daniele, "Search-Less Algorithm for Star Pattern Recognition". pp. 179-194.

Mortari, Daniele, "A Fast On-Board Autonomous Attitude Determination System Based on a New Star-ID Technique for a Wide FOV Star Tracker", AAS 96-158, pp. 893-903.

Elstner, Ch., Wunder, D., "Autonomous Attitude Determination".

Baldini, D., Barni, M., Foggi, A., Benelli, G., Mecocci, a., "Star-Configuration Searching for Satellite Attitude Computation".

Udomkesmalee, Suraphol, Alexander, James W., Tolivar, Aurelio F., "Stochastic Star Identification".

Ju, Gwanghyeok; Kim, Hye-Young; Pollock, Thomas C.; Junkins, John L.; "Lost-In-Space: A Star Pattern Recognition and Attitude Estimation Approach for the Case of No Prior Attitude Information", AAS-00-004, Feb. 2-6, 2000: pp. 1-16.

Samaan, Malak A.; Mortari, Daniele; Junkins, John L.; "Recursive Mode Star Identification Algorithms", AAS-01-149, Feb. 2001, pp. 1-18.

Shucker, B., Fasse, E.D., "A Ground-Based Prototype of a CMOS Navigational Star Camera for Small Satellite Applications", 15th AIAA/USU Conference on Small Satellites.

Ju, G., Kim, H., Pollock, T., and Junkins, J.L., "Digistar: A Low Cost Micro Star Tracker", AIAA Space Technology Conference & Exposition, Sep. 1999.

Kim, H., Junkins, J.L., and Mortari, D., "A New Star Pair Pattern Recognition Method: Star Pair Axis and Image Template Matrix Method".

* cited by examiner

METHOD AND APPARATUS FOR ON-BOARD AUTONOMOUS PAIR CATALOG GENERATION

CROSS REFERENCE TO RELATED APPLICATIONS

The present invention is related to U.S. provisional Patent Application 60/535,258 filed Jan. 9, 2004, entitled "Fast Access Pair Catalog" and U.S. provisional Patent Application 60/535,721 filed Jan. 9, 2004, entitled "Algorithm Design For Onboard Autonomous Pair Catalog Generation" that are incorporated by reference herein.

FEDERAL RESEARCH STATEMENT

This invention was made with Government support. The Government has certain rights in this invention.

BACKGROUND OF INVENTION

The present invention relates generally to attitude or angular velocity or sensor alignment estimate adjustment for a vehicle, and more particularly, to algorithms involving attitude or angular velocity or sensor alignment determination, using star position measurements.

Satellites and other vehicles are in widespread use for various purposes including scientific research and communications. Many scientific and communications missions, however, cannot be accurately fulfilled without consistently monitoring and controlling the 3-axis attitude and angular velocity of the vehicle. Attitude may be described as the vehicle orientation with respect to some frame, for example, the Earth-Centered Inertial (ECI) frame. In many applications, the vehicle must be oriented to transmit signals in particular directions or to receive signals from specifically located sources. Furthermore, in such a situation, the vehicle angular velocity must be such so as to maintain the desired orientation, over time. Without accurate control over vehicle 3-axis attitude and angular velocity, the transmission or reception of such signals is hindered and at times impossible.

Such control requires systems for 3-axis attitude and angular velocity determination, which generally include one or more star trackers and a 3-axis gyroscope. During normal operation, star trackers or star sensors provide attitude-related information and the 3-axis gyroscope provides angular velocity information. As there are inherent, and time-varying, errors from star trackers, star sensors, and gyros, it is often necessary to constantly estimate such errors, in order to compensate for them. One common method of doing so is to correlate star tracker or sensor position measurements of stars with known positions of the same stars, as listed in a star catalog, or database. Discrepancies between the measured and predicted positions allow direct estimation of tracker error, and indirect estimation of gyro error. Knowing such errors allows estimation of attitude or angular velocity, or refinement of existing estimates. Furthermore, if there are multiple star trackers or star sensors on-board, such correlations allow determination of the alignment of such trackers or sensors, with respect to each other; such determination yields greater accuracy in future attitude and angular velocity estimates.

Upon initialization, procedures such as described above often require a method for obtaining a coarse estimate of attitude, where, for example, attitude is considered to be the orientation of the vehicle with respect to the ECI frame. Typically, this method includes two steps. The first step is to identify stars detected by one or more of the star trackers or star sensors as known stars from an astronomical database. A star catalog, which is an astronomical database or portion thereof, is used for this purpose. Each entry of the star catalog contains information about a particular star, such as the star's position in the ECI frame. Each entry is associated with a star catalog index, allowing a user to locate the entry. The second step of the method is to use the following to obtain the vehicle attitude: the knowledge of the stars' positions with respect to some frame, which is represented in the database; the knowledge of the stars' positions in the star tracker frame, which is output by the star tracker or star sensor; and the knowledge of the alignment of the star sensor or tracker with respect to the vehicle body.

A star pair database, also referred to as a pair database, or a pair catalog database, may be used to aid in the identification procedure of the first step of the method described above. The star pair database contains a reference table, and a star pair catalog, also referred to as a pair catalog. The reference table is to aid in accessing entries from the star pair catalog. Each entry of the star pair catalog represents a pair of stars, where each star in the pair is represented in the star catalog. All possible star pairs may not be represented; for such a design, there exist criteria to decide which star pairs are to be represented in the pair catalog. Such criteria may be based upon, for example, magnitude of stars in the pair, or angular separation between the stars forming the pair.

As will be recognized by those skilled in the art, the star pair database may be used in a multitude of ways to aid the identification procedure of the first step of the method described above. For example, in a situation where a vehicle of an unknown attitude includes a star tracker or star sensor that detects a pair of stars, separated by a measurable angular separation, a pair catalog can help in the identification process. (The method for determining angular separation from tracker or sensor measurements is described later in this application.) For use in such a situation, the pair catalog would be designed so that the entries would be ordered by separation angle, the angular separation between the stars forming the pair, as measured by the star sensor or star tracker on the vehicle. Should the detected star pair be a pair represented in the pair catalog, its representation would be in an easily determined section. This is because the detected star pair has an angular separation equal to the separation measured by interpretation of the star tracker or star sensor data, plus or minus instrument error. As instrument error is typically small, this reduces the number of possible matches between the detected star pair and the cataloged star pair from, for example, several thousand to perhaps a dozen or two. Other techniques may be used to determine which of the remaining pair catalog entries actually represents the detected pair.

Pair catalogs are typically large, comprising tens of thousands of entries. Pair catalogs often need to be changed over time, for various reasons. For example, proper motion of stars causes angular separation between stars forming pairs to change; this requires a change of pair catalog entries or order of the entries in the pair catalog. For designs that require the pair database to be on-board the vehicle, changing a pair catalog will often require an upload of the modified pair catalog, or sections therein, from a remote location. For example, should the vehicle be a satellite already in orbit, the upload must be done from a ground station, possibly during limited periods of contact with the satellite. Such an upload can be time-consuming, and, in the event of error, or transmission failure, hazardous. Therefore, it is desirable to design a method of pair catalog update or change such that the pair catalog upload, and associated problems or risks, are not required.

SUMMARY OF INVENTION

The present invention reduces the problems associated with uploading a pair catalog to a vehicle by populating the pair catalog on the vehicle.

In one aspect of the invention, the vehicle software includes encoded algorithms providing the ability to autonomously generate a pair catalog.

In a further aspect of the invention, a vehicle includes an attitude or angular velocity control system, a star tracker having a field of view, a star database a star catalog stored therein, and a star pair database, having memory allocated for a star pair catalog and reference table stored therein. A processor is coupled to the attitude or angular velocity control system, the star tracker, the star database, and the star pair database. The processor populates the pair catalog, i.e. determines, and writes to the appropriate memory locations, the pair catalog entries. Once this is done, the processor periodically calculates an estimation of the vehicle inertial attitude or angular velocity, based, in part, on values represented in the star pair catalog.

One advantage of the invention is that the processing may take place onboard the vehicle. This eliminates problems that can occur due to calculations being performed at a remote site, and the pair catalog uploading time and effort.

Other aspects and advantages of the present invention will become apparent upon the following detailed description and appended claims, and upon reference to the accompanying drawings.

DETAILED DESCRIPTION

Figure 1:
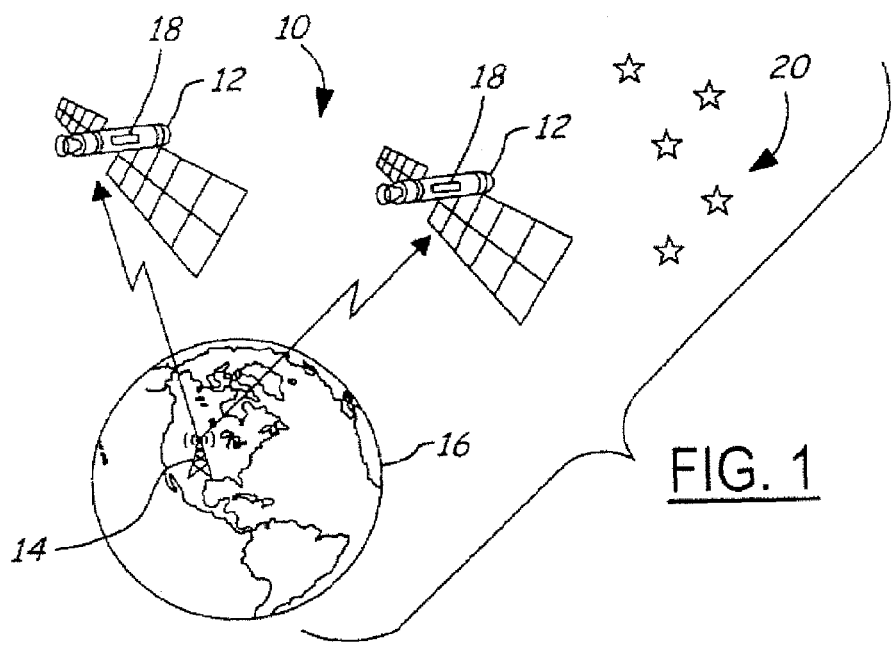
FIG. 1 is a perspective view of a set of vehicles (depicted as a satellite system, in accordance with the preferred embodiment of the present invention) for determining stars in a star tracker field of view.

In the following figures the same reference numerals will be used to identify the same components. The present invention is described with respect to a pair catalog database, for a vehicle. It should be noted that various types of vehicles might benefit from the system.

Referring to FIG. 1, a perspective view of a system 10 for determining stars in a star tracker field of view (FOV) in accordance with one embodiment of the present invention is illustrated. The system 10 is comprised of one or more vehicles 12. Although not required, the system may also be in communication with a station 14 on earth 16. Each vehicle 12 includes an apparatus 18 for determining or controlling inertial attitude or angular velocity based upon measurements of positions of a plurality of stars 20. The vehicle 12 may be one of various types of vehicles, including satellites or other spacecraft.

Figure 2:
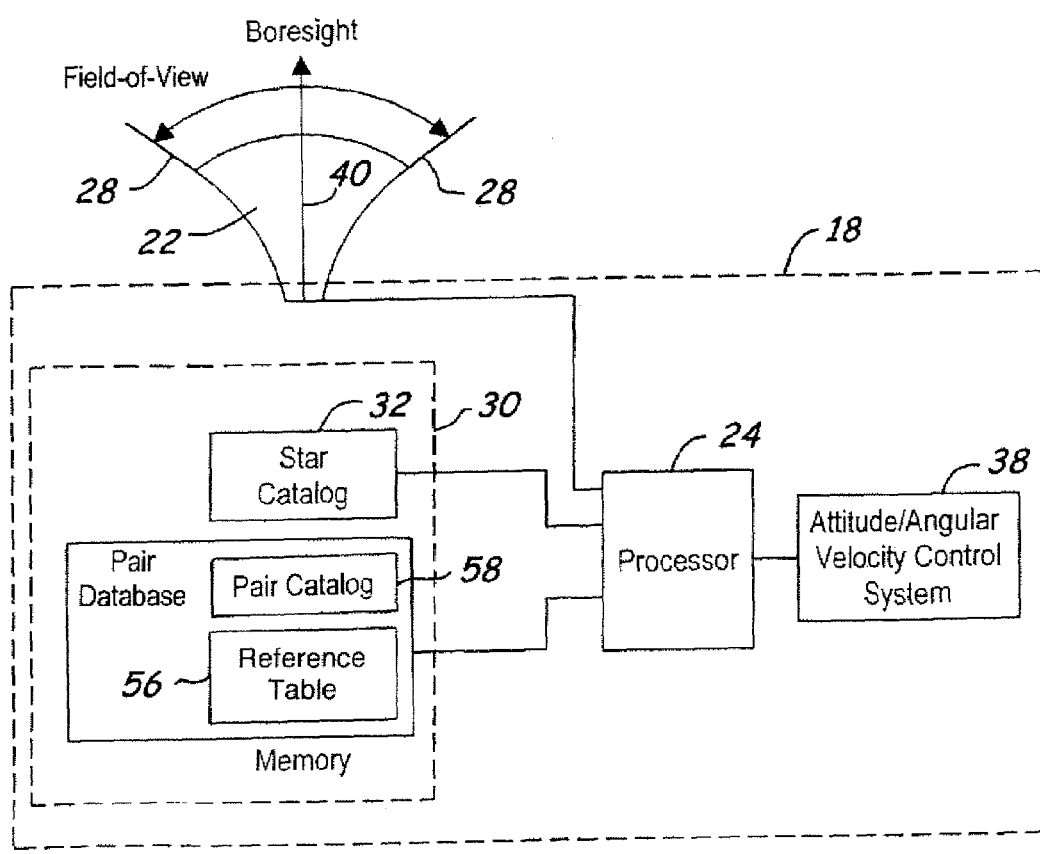
FIG. 2 is a block diagram of an apparatus for controlling a vehicle in accordance with the preferred embodiment of the present invention.

Referring to FIG. 2, a block diagram of apparatus 18 for determining or controlling attitude or angular velocity for a vehicle in accordance with one embodiment of the present invention is illustrated. Apparatus 18 includes one or more star trackers or star sensors 22, and a processor 24. Apparatus 18 also includes a memory 30 that includes a star catalog 58, a star pair catalog 34 and a reference table 56. The processor 24 may also be coupled to an attitude or angular velocity control system 38. The processor 24 and memory 30 need not be physically on the vehicle 12; either may be, for example, at the ground station 14.

A star tracker sensor or star tracker 22 is mounted to the vehicle 12 and transmits data to processor 24 in a conventional manner. Star tracker 22 includes a field of view (FOV) 28 and a boresight 40 in the FOV 28. Star tracker 22 is used to sense a plurality of positions, relative to star tracker 22, of a plurality of stars 20. Star tracker 22 then generates a plurality of signals corresponding to the plurality of star positions in the FOV 28. It should be noted that more than one star tracker 22 might be included on a vehicle.

Processor 24 may be an individual processor or may be comprised of a plurality of processors. For example, star tracker 22 may include its own processor. Likewise, attitude or angular velocity control system 38 may also comprise its own processor such as a spacecraft control processor (SCP). For simplification purposes the processor is illustrated as a single component. Each processor may be microprocessor-based. Processor 24 is coupled to star tracker 22 and receives the plurality of signals corresponding to the plurality of star positions in the FOV 28. Processor 24 provides control logic operative to select at least one of the plurality of signals corresponding to the positions of one or more stars. Processor 24 may use star catalog 32 to determine which stars 20 to select. Processor 24 might be used to implement a method as described above to determine which entries in star catalog 32 correspond to the one or more stars detected by star sensor or star tracker 22.

Memory 30 is illustrated as a plurality of separate elements. Those skilled in the art will recognize that the memory may comprise a single or multiple memory system. It should also be noted that if a microprocessor is used for processor 24 that the microprocessor may include memory therein. The memory may include various types of memory including but not limited to random access memory (RAM).

The attitude or angular velocity control system 38 may comprise a plurality of actuators, for example, thrusters or momentum wheels, as will be evident to those skilled in the art. The attitude or angular velocity control system 38 controls the various actuators to orient the vehicle in its desired direction.

Figures 3, 4:
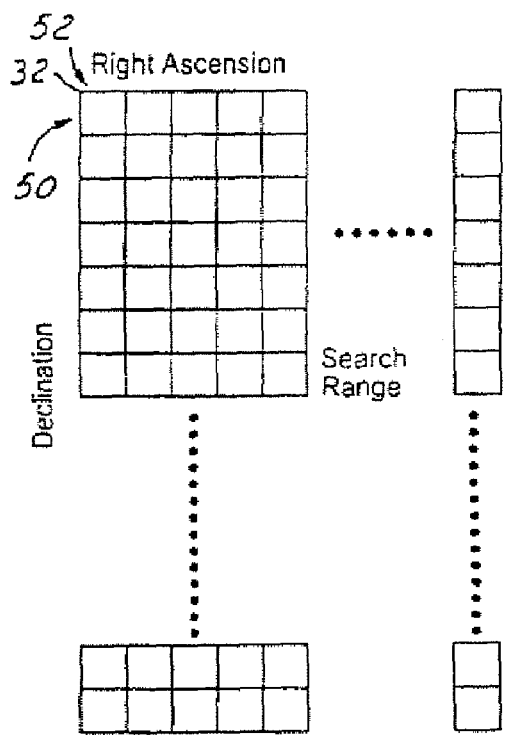
FIG. 3 is an illustration of a star catalog according to the present invention.
FIG. 4 is a representation of a pair catalog according to the present invention.

Referring now to FIG. 3, an example of a simplified database, star catalog or sub-catalog 32 is illustrated. Each entry in catalog or sub-catalog 32 may include associated star information. Star catalog 32 is illustrated having rows 50 and columns 52. The rows correspond to declination and the columns correspond to the right ascension. Thus, each square represents a first star with a specific right ascension and declination. In one embodiment of the invention, the pair catalog may reference the stars that comprise star pairs by referencing the location of the corresponding entries in the star catalog.

Referring now to FIG. 4, an example of a pair catalog 58' is illustrated. In this pair catalog, groups of entries are stored in memory locations; we refer to the locations of any single group as a "bucket." The plurality of buckets labeled 1-m each correspond to a row in the figure. The decision of which entries fall into which bucket is made according to a metric associated with each star pair catalog entry.

In the example, the metric is related to the separation angle, the angular separation between the stars forming the pair, as determined by star sensor or star tracker measurements. The metric chosen, for example, may be the separation angle itself, or a quadratic function of separation angle, or the cosine of the separation angle. Each of these metrics has advantages. For example, the quadratic function, or cosine, of the separation angle may be used to facilitate evenly dividing the star pairs into a number of equally sized buckets.

Each bucket has a plurality of entries 102 that may include spares 104; spares or spare entries are entries that do not represent star pairs. Spares may be used, for example, to ensure that each pair bucket contains the same numbers of entries, regardless of how many star pairs are actually in the bucket. As will be further described below, the pair buckets may be uniformly distributed which may reduce the need for spares. However, spares may also be provided in a uniformly distributed table. Each space in the figure corresponds to a pair catalog entry, or pair record, for each star pair represented that may contain the star catalog indices of the two stars. Alternatively, the pair record may include a star catalog index of the first star, and a value representing the location, in the star catalog, of the second star, with respect to the location of the first star. It should be noted that in this embodiment no sorting is required for pair entries residing in the same bucket, which saves time during pair catalog generation. It should also be noted that an entry in the pair catalog of the present invention need not include the separation angle, and thus the amount of memory required for the pair database is reduced.

Figures 5, 6:
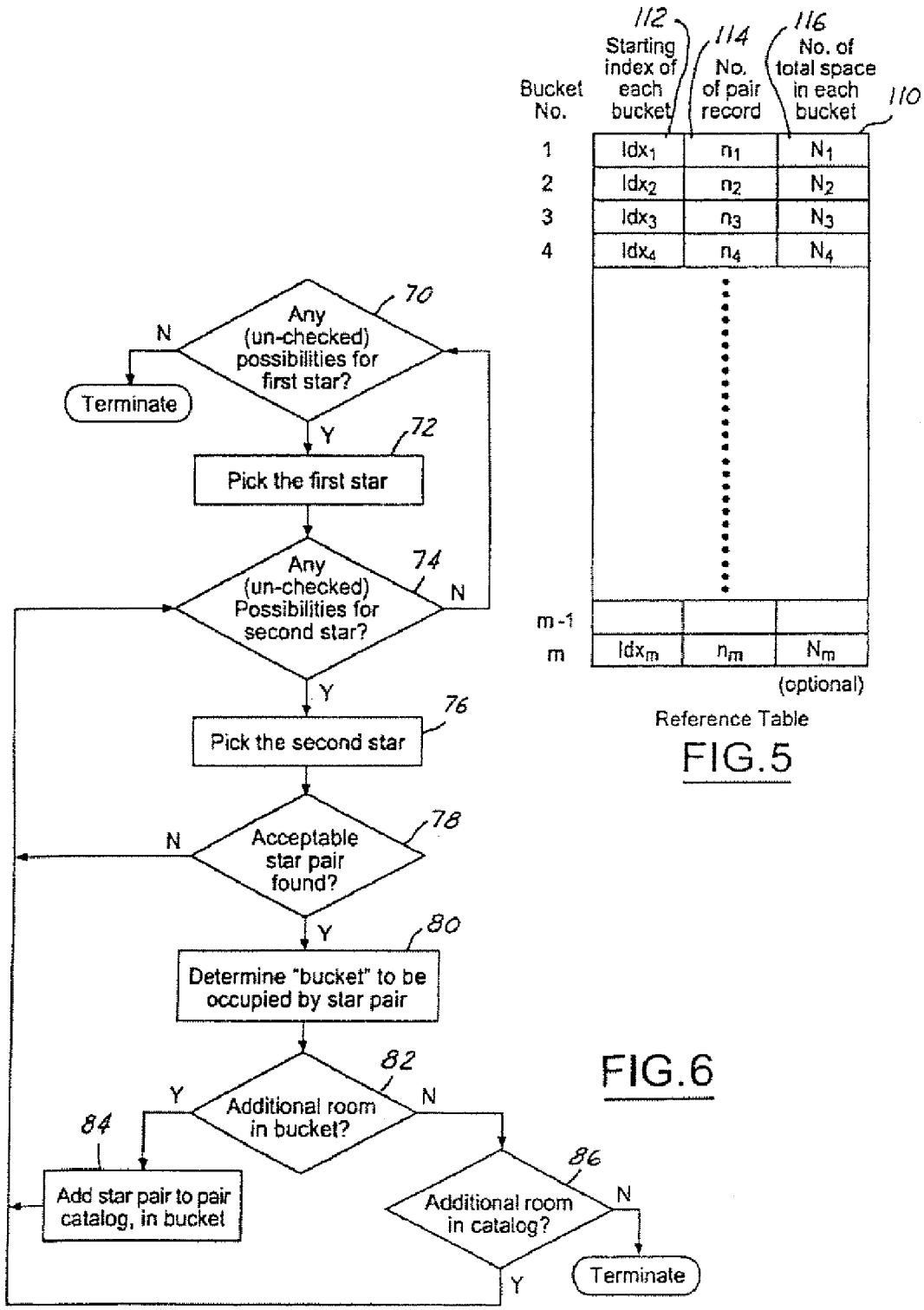
FIG. 5 is a reference table associated with the pair catalog of FIG. 4.
FIG. 6 is a flow chart illustrating a method for generating a pair catalog according to the present invention.

Referring now to FIG. 5, a reference table 110 is illustrated. Reference table 110 allows fast access for referencing sets of entries in the pair catalog. When a user needs to know which pair catalog entries refer to star pairs with an associated metric within a certain range, reference table 110 is used to determine the starting and ending pair buckets. Each of the reference table entries corresponds directly to a pair catalog bucket. The bucket associated with the metric at one end of the desired range will be the starting bucket, while the bucket associated with the metric at the other end of the desired range will be the ending bucket. The desired pair catalog entries will be those between the starting and ending buckets (inclusive).

For the reference table shown in FIG. 5, each reference table entry contains: a first element 112 corresponding to the starting index, in the pair catalog, of the associated bucket; a second element 114 corresponding to the number of pair catalog entries in the bucket; and a third element 116 corresponding to the number of pair catalog entries plus spares, in that bucket. If each of the buckets is of the same size, the element 116 may be eliminated since the number of spaces would previously be known. Alternatively, if the pair catalog entries are placed in memory consecutively, so that the numbers of pair catalog entries plus spares for a given bucket may be deduced from the starting indices of the bucket, and the next bucket, element 116 may again be eliminated. (For the latter case, provision would have to be made for calculation of size of the final bucket.) Furthermore, if provision is made so that referencing a spare entry will not cause problems with the invoking software, the second element 114 may likewise be eliminated.

The method described herein pre-supposes a valid reference table, as shown in FIG. 5, be available to processor 24. The reference table may be generated for this purpose in various ways. In the preferred embodiment, a "master pair catalog" is determined in a conventional manner at a remote location, for example, ground station 14. The master pair catalog is defined as a database containing all information in the pair catalog, as well as additional data (for example, the metric associated with each entry). Each entry i in the master pair catalog corresponds to entry i in the desired pair catalog, however each entry in the master pair catalog comprises as much or more information than the corresponding pair catalog entry. Therefore, pair catalog entry indices, Idx1 through Idxm, as represented in FIG. 5, correspond to master pair catalog indices Idx1 through Idxm. The master pair catalog is sorted, in a conventional manner, so that the metrics associated with the individual entries are in ascending or descending order. The reference table is then populated using the indices of the master pair catalog, which, as mentioned earlier, are equal to the indices of the pair catalog. Assume, for example, that the master pair catalog is ordered so that the metrics associated with the entries are in ascending order. As shown in FIG. 5, there are m reference table entries, where the i-th reference table entry, entry i, includes a reference to Idxi, the master pair catalog location of the first master pair catalog entry with an associated metric having a value greater than or equal to Vi. The reference table may be generated, for example, by executing the following steps for each reference table entry i, beginning with i=1, and proceeding, sequentially, through i=m: searching for the first master pair catalog entry with associated metric greater than or equal to Vi; then populating reference table entry i with Idxi, the location of that master pair catalog entry. In the above description, the search for entry Idxi, where i=1, would be a search through all pair catalog entries. The search for entry Idxi, where i is greater than 1, would be a search through all master pair catalog entries beginning with the first master pair catalog entry after entry Idxj, where j=i-1. The reference table is then uploaded to the vehicle.

As mentioned earlier, a key advantage of this invention is that it avoids an upload of the pair catalog to the vehicle. The pair catalog upload is replaced with a reference table upload. It should be noted that an upload of the reference table is a far less onerous task than the upload of the entire pair catalog. This is because the reference table typically contains only a few hundred entries, while the pair catalog typically contains tens of thousands. Furthermore, the reference table may have as few as one element per entry, that element being a pair catalog location, while the pair catalog requires at least two elements per entry, those elements being references to the two entries in the associated star catalog corresponding to the stars forming the star pair.

Referring now to FIG. 6, a method for generating a pair catalog, as described by this invention, is illustrated. In step 72, a star represented in the star catalog illustrated in FIG. 3 is chosen; it is designated to be the "first star" of a plurality of potential star pairs. In step 74, the star catalog is then checked to see if any entries exist which represent a star that may be paired with the selected first star. In step 76, if at least one such entry does exist, an eligible star catalog entry is chosen to serve as the second star of the prospective pair; otherwise, a new first star, if any such exist, is chosen. In step 78, the two stars are checked to see if they form an acceptable star pair. Criteria for acceptance may depend upon, for example, the angular separation between the stars, or the stars' magnitudes. If the star pair is not found to be acceptable in step 78, a search for another second star (if any more possibilities exist) is continued in step 76. Conversely, if an acceptable star pair is found in step 78, the pair catalog "bucket" in which the star pair should reside is found in step 80; this is done by first evaluating the metric associated with the star pair, then using the metric to determine the appropriate bucket. If the bucket has room for another star pair, as determined by the allocation of pairs for that bucket, as derived, for example, from the reference table, an entry representing the star pair is added to the pair catalog, in the relevant bucket, as shown in step 84; after that, the search for another second star resumes. Conversely, if the bucket does not have room for the star pair, then step 86, an optional step of determining whether all of the buckets are full may be executed. If step 86 is executed, then if all buckets are full, the catalog is complete, so the pair catalog generation procedure is terminated; otherwise, the search for another second star resumes. Should step 86 be omitted, the search for another second star resumes after step 82. It should be noted that after the pair catalog is formed using this procedure, no sorting is required.

Many useful prior-art techniques for efficiently executing steps 70 and 74 in FIG. 6 are described in the cited prior-art references. For instance, in step 74, it is useful to reduce or eliminate the need to examine stars that were already chosen as first stars in step 72. This can be simply arranged by selecting the first stars sequentially with respect to some index. The search for the second star in step 74 can then be restricted to stars with indices larger than the current first star, and the determination of "Any (un-checked) possibilities for first star" in step 70 is false once the first star with the second-to-last index is processed. The set of stars to be searched in step 74 can be limited by any of the many prior art methods for storing a star catalog so that a set of star records guaranteed to be a superset of the records for all stars within a given separation bound of a given first star is easily determined. Step 74 returns false if this superset is exhausted for a given first star.

As is assumed in the above description, the metric associated with each pair represented in the pair catalog must be calculable from the data given. Similarly, effective use of the pair catalog to identify detected stars as corresponding to star catalog entries, and hence to determine vehicle attitude or angular velocity, or sensor alignment, also relies on the ability to compute the metric associated with each pair. In the preferred embodiment, this metric is a function of angular separation between pairs of stars represented in the pair catalog, or detected by the star sensor or star tracker. For example, there are various methods for calculating the angular separation between the stars forming a pair, for either stars corresponding to star catalog entries or detected stars. Typically, such methods begin with a step in which the star positions of the stars forming the pair are represented as vectors, with respect to the same frame. The procedure for doing so varies, depending on whether the goal is to determine vectors for stars corresponding to star catalog entries, or detected stars.

For star catalog entries, the entry may include corresponding star position, expressed as a vector, with respect to the ECI frame. Alternatively, if the star position is represented using right ascension and declination, as in FIG. 3, a vector may be derived from those quantities. This procedure is discussed extensively in the literature, for example, in Section 2.11 of "Fundamentals of Astrodynamics", by R. R. Bate, D. D. Mueller, and J. E. White (Dover Publications, Inc., New York, 1971).

For detected stars, typically, the star tracker or star sensor reports observed position of a star with respect to pixels on a charge-coupled device (CCD), for example, a horizontal and vertical position with respect to the tracker boresight. To compute the separation between two observed stars in pixel-based star trackers, one can convert the observed position of each star from star tracker pixel space to vectors. The star horizontal and vertical pixel positions Hi and Vi are mapped to the vector to the ith star in the star tracker frame, vi=[Hi, Vi, F]. Sometimes the units of Hi and Vi are chosen so that F=1.

The star separation between stars can then be found by finding the sine and/or cosine of the separation angle, theta, from these relations between the dot product and/or cross product between the two star vectors and the magnitudes of the star vectors:

$$Va.dot.Vb = |Va||Vb|\cos(theta)$$

$$|Va.cross.Vb| = |Va||Vb|\sin(theta),$$

where dot is the dot product and cross is the cross product.

In contrast, the separation metric (sin(theta))^2 does not require evaluation of transcendental functions, has the useful property that the number of star pairs per equal increment of separation metric is nearly uniform for the relatively small separation angle that are frequently of interest. This property is shared by any separation metric whose derivative with respect to theta is nearly proportional to theta for small theta, such as cos(theta), theta^2 and other metrics that are quadratic with theta.

Two convenient formulas for computing the separation metric (sin(theta))^2 are:

(sin(theta))^2=1 (Va.dot.Vb)^2/(Va.dot.Va) (Vb.dot.Vb)) and (sin(theta))^2=A.dot.A/((Va.dot.Va)(Vb.dot.Vb)), where A=Va.cross.Vb.

The advantage of the second formula is that it avoids the issue of the poor numerical conditioning of cos(theta) for small theta that the first formula shares with the prior art cos(theta) separation metric. The (sin(theta))^2 metric is discussed in the paper "Attitude Determination for Kompsat-2 Using Star Identification Technique" under the name "Interstar-Sine Method." Equation (2) of this paper also gives an efficient implementation of the second formula above that takes advantage of the fact that the term F^2 can be precomputed once and reused several times for each computation of the measured separation star metric.

Figure 7:
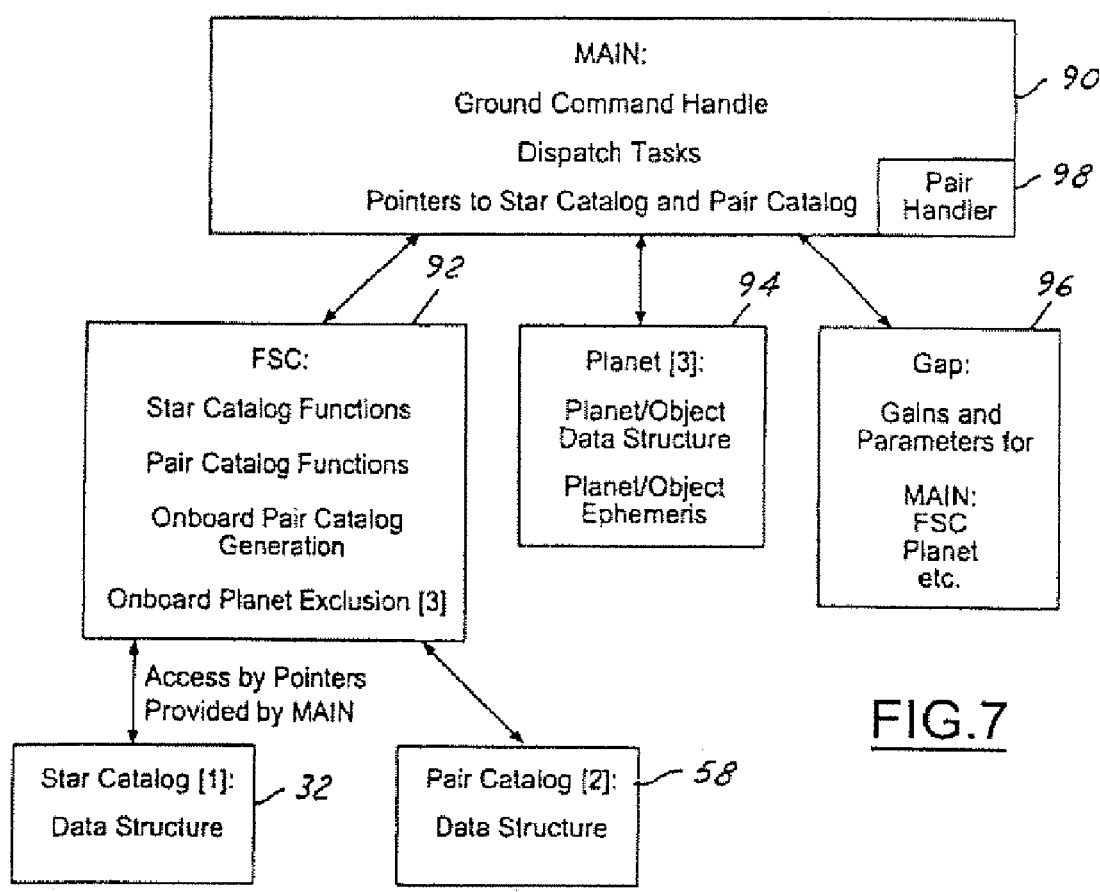
FIG. 7 is a high level diagrammatic view of the software layout of the present invention.

Referring now to FIG. 7, the method described herein is facilitated by a new architecture that divides the whole coding into several specific components. As illustrated, a main component is the top level coordinator between different low level components. That is, there is no communication between low level components. All the communications are through the main component. For example, only the main component 90 can reset all gains and parameters in the low level components to default values that are stored in GAP 96. Since each low level component is independent of each other, the code reusability is high and the maintenance is much easier. Main 90 also contains pointers to the star catalog and pair catalog and provides the pointers to the low level components such as the flight star catalog (FSC) for accessing the database catalog. Main 90 also contains command handles for the ground station and dispatch functions for periodic tasks.

The main 90 also contains a pair handler 98 that is used to assign a pair handle to users, upon request. The pair handle is assigned to a user whose task is to search the pair catalog for entries representing star pairs for which the associated metric has some specified value, or range of values. The user specifies the value, or range of values, to the pair handler, in a conventional manner. For example, the user invokes a function, for which the value, or range of values, is the argument. The pair handler produces a pair handle, sent to the user, in a conventional manner. For example, the pair handle is the returned by the aforementioned function.

The pair handle is used to access the relevant section of the pair catalog. The design may be such that the pair handle is used to obtain data pertaining to one pair catalog entry, or a set of pair catalog entries. For the preferred embodiment, data associated with a set of pair catalog entries is desired. The set contains consecutive pair catalog entries. A software function, or its equivalent, is used to return the pair handle associated with the first pair catalog entry in the aforementioned set, and an integer N, where N is the number of pair catalog entries in the aforementioned set. This function, or its equivalent, is referred to as the "initialization function." Another function, or equivalent, is also used, referred to as the retrieval function. The retrieval function is to be invoked with argument corresponding to the pair handle associated with pair catalog entry i, where i is an integer from 1 to N. The retrieval function returns data associated with pair catalog entry i, and a different pair handle, which may be used to retrieve data associated with pair catalog entry (i+1). By invoking the initialization function once, then the retrieval function N times, the user may retrieve data for each pair catalog entry in the set. For the first invocation of the retrieval function, the pair handle previously returned by the initialization function is the argument. For all other invocations, the pair handle returned by the previous invocation of the retrieval function is the argument.

With software designed so that such a pair handle is provided, the user is granted the capability of being able to access pair catalog entries without being required to design a search, or have knowledge of the architecture or contents of the pair catalog software. By providing different handles to various users, the pair catalog may be simultaneously accessed by more than one user. The pair handle can also have a null value, indicating that the pair handle does not access any pairs. A null pair handle may be used, for example, when a user attempts to access pair catalog entries while the pair catalog is being generated, using the method illustrated in FIG. 5.

The main component 90 may handle various ground command handles, dispatch tasks, and pointers to the star catalog. The FSC block 92 handles the star catalog functions, pair catalog functions, on board pair generation, and on board planet exclusion. The planet block 94 generates planet/object data structure and planet/object ephemeris data. GAP block 96 is the gains and parameter block for the main component 90, block 92, and block 94. Various gains and parameters are set forth therein for the operation of those components. The various pointers are controlled by the FSC block for the star catalog 32 and pair catalog 58.

The present invention allows the star inertial attitude determination algorithm to rapidly find pairs in the pair catalog. Speed for accessing the pair catalog in a vehicle is desirable. The present method may be used as part of a lost-in-space (LIS) attitude determination. The time is reduced using the reference table to rapidly determine the bucket of interest. Thus, the processor uses both the reference table then the star pair catalog for determining the vehicle inertial attitude or angular velocity.

It should be noted that the steps described above might all be performed on the spacecraft. This prevents problems due to timing and errors due to the transmission of the information from a ground station.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

The invention claimed is:

1. A method for autonomously generating a star pair catalog on-board a vehicle, comprising:
    generating a master star pair catalog at a remote location, wherein entries of said master star pair catalog include the values of at least one metric, and said master star pair catalog is ordered according to said values of said at least one metric,
    generating a reference table at said remote location,
    populating said reference table using the indices of said master star pair catalog at said remote location,
    transmitting said reference table from said remote location to said vehicle,
    determining, on-board said vehicle, suitable star pair catalog locations using said reference table and said values of said at least one metric,
    determining, on-board said vehicle, a plurality of star pair catalog entries for said star pair catalog from a star catalog;
    storing said plurality of star pair catalog entries in said star pair catalog.

2. A method as recited in claim 1 wherein determining a plurality of pair catalog entries comprises determining a first entry of the plurality of pair catalog entries by:
    a) determining whether the star pair catalog contains an entry corresponding to a first star of a star pair;
    b) terminating the method without a star pair catalog entry, when no possible first star exists; otherwise, selecting the first star;
    c) determining whether the star catalog contains an entry corresponding to a second star of the star pair;
    d) eliminating the first star from future consideration as the first star, then returning to step a), when no possible second star exists; otherwise, selecting the second star;
    e) determining whether the first star and second star form an acceptable star pair;
    f) eliminating the second star from future consideration as the second star, when a current first star is used as first star, then returning to step c), should the first star and second star fail to form an acceptable star pair;
    g) determining a set of potential pair catalog locations which may be occupied by the pair catalog entry representing the star pair formed by the first and second star;
    h) determining whether one of the act of potential pair catalog locations is currently not occupied by a previously determined pair catalog entry;
    i) eliminating the second star from future consideration as a second star, when the first star is used, then returning to step c), should a suitable unoccupied pair catalog location not exist; otherwise, populating the pair catalog location with a pair catalog entry representing the star pair formed by the first and second star.

3. A method as recited in claim 2 wherein any star referenced by a star catalog entry maybe chosen to serve as the first star of the star pair.

4. A method as recited in claim 2 wherein any star referenced by a star catalog entry may be chosen to serve as the first star of the star pair, on the condition that the star satisfy a plurality of constraints, as determined by the corresponding star catalog entry.

5. A method as recited in claim 4 wherein the plurality of constraints comprise the star have a magnitude equal to, or brighter than, a specified magnitude threshold.

6. A method as recited in claim 4 wherein the plurality of constraints comprise the star occupy a position within a specified range of a specified position.

7. A method as recited in claim 2 wherein any star referenced by a star catalog entry can be chosen to serve as the second star of the star pair, on the condition that the star satisfy a plurality of constraints, as determined by the corresponding star catalog entry.

8. A method as recited in claim 7 wherein the plurality of constraints comprise the star have a magnitude equal to, or brighter than, a specified magnitude threshold.

9. A method as recited in claim 7. wherein the plurality of constraints comprise the angular separation between the first star and the second star, as determined from the positions of each star as derived from the corresponding star catalog entries, be less than or equal to a specified value.

10. A method as recited in claim 7 wherein the plurality of constraints comprise the angular separation between the first star and the second star, as determined from the positions of each star as derived from to corresponding star catalog entries, be greater than or equal to a specified value.

11. A method as recited in claim 7 wherein the plurality of constraints comprise the star catalog index of the entry corresponding to the second star not be equal to the star catalog index of the entry corresponding to the first star.

12. A method as recited in claim 11 wherein the plurality of constraints comprise the star catalog index of the entry corresponding to the second star must be greater than the star catalog index of the entry corresponding to the first star.

13. A method as recited in claim 7 wherein the plurality of constraints comprise the magnitude difference between first and second star being less than or equal to a specified value.

14. A method as recited in claim 2 wherein the specified value of a metric is calculated for a star pair formed by a first star and second star.

15. A method as recited in claim 14 wherein the metric is a mathematical function of the angular separation between the first and second star, as determined by the positions of the stars as determined using information from the star catalog entries for the stars.

16. The method as recited in claim 1 for determining suitable pair catalog locations comprising: determining a reference table index using the value of the metric; determining the appropriate pair catalog locations for the star pair using the reference table entry referenced by the aforementioned reference table index.

17. A method as recited in claim 1 wherein determining a plurality of star pair catalog entries comprises: determining a first star; determining a second star having a predetermined angular distance and separation representation; in response to a separation representation least significant bit, storing the pair in a pair bucket of the pair catalog.

18. A system comprising:
a) a vehicle comprising, an attitude control system or angular velocity control system; and a plurality of star trackers or star sensors each having a field of view; said star tracker or star sensors generating observations;
b) a memory having a star catalog and a star pair database, comprising a star pair catalog and reference table stored therein, said reference table having a plurality of star pair catalog entries;
c) a processor coupled to said attitude or angular velocity control system and said memory, said processor determining a vehicle inertial attitude or angular velocity, star tracker or star sensor observations, and the contents of the memory,
wherein said processor determines said star pair catalog located within said memory following the steps comprising:
generating a master star pair catalog at a remote location, wherein entries of said master star pair catalog include the values of at least one metric, and said master star pair catalog is ordered according to said values of said at least one metric,
generating said reference table at said remote location,
populating said reference table using the indices of said master star pair catalog at said remote location,
transmitting said reference table from said remote location to said vehicle,
determining, on-board said vehicle, suitable star pair catalog locations using said reference table and said values of said at least one metric,
determining, on-board said vehicle, said plurality of star pair catalog entries for said star pair catalog from said star catalog,
storing said plurality of star pair catalog entries in said star pair catalog.

19. A system as recited in claim 18 wherein the vehicle comprises a spacecraft.

20. A system as recited in claim 18 wherein the processor determines a star pair catalog entry, and stores the entry at a location in memory by:
a) determining whether the associated star catalog contains an entry corresponding to a first star of a star pair;
b) terminating the method without a star pair catalog entry, when no possible first star exists; otherwise, selecting a first star;
c) determining whether the star catalog contains an entry corresponding to a second star of a star pair;
d) eliminating the first star from future consideration as a first star, then returning to step a), when no possible second star exists; otherwise, selecting to second star;
e) determining whether the first star and second star form an acceptable star pair;
f) eliminating the second star from future consideration as the second star, when the current first star is used as first star, then returning to step e), should the first star and second star fail to form an acceptable star pair;
g) determining a set of potential pair catalog locations which may be occupied by the pair catalog entry representing the star pair formed by the first and second star;
h) determining whether one of the set of potential pair catalog locations is currently not occupied by a previously determined pair catalog entry;
i) eliminating the second star from future consideration as a second star, when the first star is used, then returning to step c), should a suitable unoccupied pair catalog location not exist; otherwise, populating the pair catalog location with a pair catalog entry representing the star pair formed by the first and second star.

21. A system as recited in claim 20 wherein any star referenced by a star catalog entry may be chosen to serve as the first star of the star pair.

22. A system as recited in claim 20 wherein any star referenced by a star catalog entry can be chosen to serve as the first star of the star pair, on the condition that the star satisfy a plurality of constraints, as determined by the corresponding star catalog entry.

23. A system as recited in claim 22 wherein the plurality of constraints comprise the star have a magnitude equal to, or brighter than, a specified magnitude threshold.

24. A system as recited in claim 22 wherein the plurality of constraints comprise the star occupy a position within a specified range of a specified position.

25. A system as recited in claim 20 wherein any star referenced by a star catalog entry can be chosen to serve as the second star of the star pair, on the condition that the star satisfy a plurality of constraints, as determined by the corresponding star catalog entry.

26. A system as recited in claim 25 wherein the plurality of constraints comprise the star have a magnitude equal to, or brighter than, a specified magnitude threshold.

27. A system as recited in claim 25 wherein the plurality of constraints comprise the angular separation between the first star and the second star, as determined from the positions of each star as derived from the corresponding star catalog entries, be less than or equal to a specified value.

28. A system as recited in claim 25 wherein the plurality of constraints comprise the angular separation between the first star and the second star, as determined from the positions of each star as derived from the corresponding star catalog entries, be greater than or equal to a specified value.

29. A system as recited in claim 25 wherein the plurality of constraints comprise the star catalog index of the entry corresponding to the second star not be equal to the star catalog index of the entry corresponding to the first star.

30. A system as recited in claim 29 wherein the plurality of constraints comprise the star catalog index of the entry corresponding to the second star must be greater than the star catalog index of the entry corresponding to the first star.

31. A system as recited in claim 29 wherein the plurality of constraints comprise the star catalog index of the entry corresponding to the second star must be less than the star catalog index of the entry corresponding to the first star.

32. A system as recited in claim 20 wherein any first star and second star are considered to form an acceptable star pair.

33. A system as recited in claim 20 wherein any first star and second star are considered to form an acceptable star pair, on the condition that the star pair satisfy a plurality of constraints.

34. A system as recited in claim 33 wherein the plurality of constraints comprise the magnitude difference between first and second star equal or exceed a specified value.

35. A system as recited in claim 33 wherein the plurality of constraints comprise the magnitude difference between first star and second star being less than or equal to a specified value.

36. A system as recited in claim 20 wherein a value of a metric is calculated for a star pair formed by a first star and second star.

37. A system as recited in claim 36 wherein the metric is a mathematical function of the angular separation between the first star and second star, as determined by the positions of the stars as determined using information from the star catalog entries for the stars.

38. A system as recited in claim 36 wherein suitable pair catalog locations are determined for the star pair using a value of the metric.

39. A system as recited in claim 18 wherein the pair catalog entry data is accessed by a user with a pair handle supplied by the software upon request.

40. A system as recited in claim 39 wherein the pair handle is provided to the user through a function with a plurality of arguments, or the equivalent.

41. A system as recited in claim 40 wherein the aforementioned function, or its equivalent, may include a pair handle as one of the arguments.

42. A system as recited in claim 41 wherein the user may obtain a plurality of pair handles, allowing access to data associated with a set of pair catalog entries, through repeated invocations of the aforementioned function, or equivalent using the pair handle returned front an earlier invocation as an argument.

43. A system as recited in claim 39 wherein the specific pair handle provided to the user depends on a user-supplied value for a metric, associated with pair catalog entries.

44. A system as recited in claim 39 wherein the pair handle provided to the user may be a null pair handle, having a value indicating that the pair handle may not be used to access pair catalog data.

45. A system as recited in claim 44 wherein the null pair handle is provided to the user on occasions when the user attempts to access pair catalog data during a period while the pair catalog is being populated.

46. A system as recited in claim 39 wherein a plurality of users may simultaneously access pair catalog data, each with separately provided pair handles.

* * * * *